Jan. 7, 1930.                A. ROZMAN                1,742,824
                        CALCULATING MACHINE
                        Filed Dec. 16, 1922
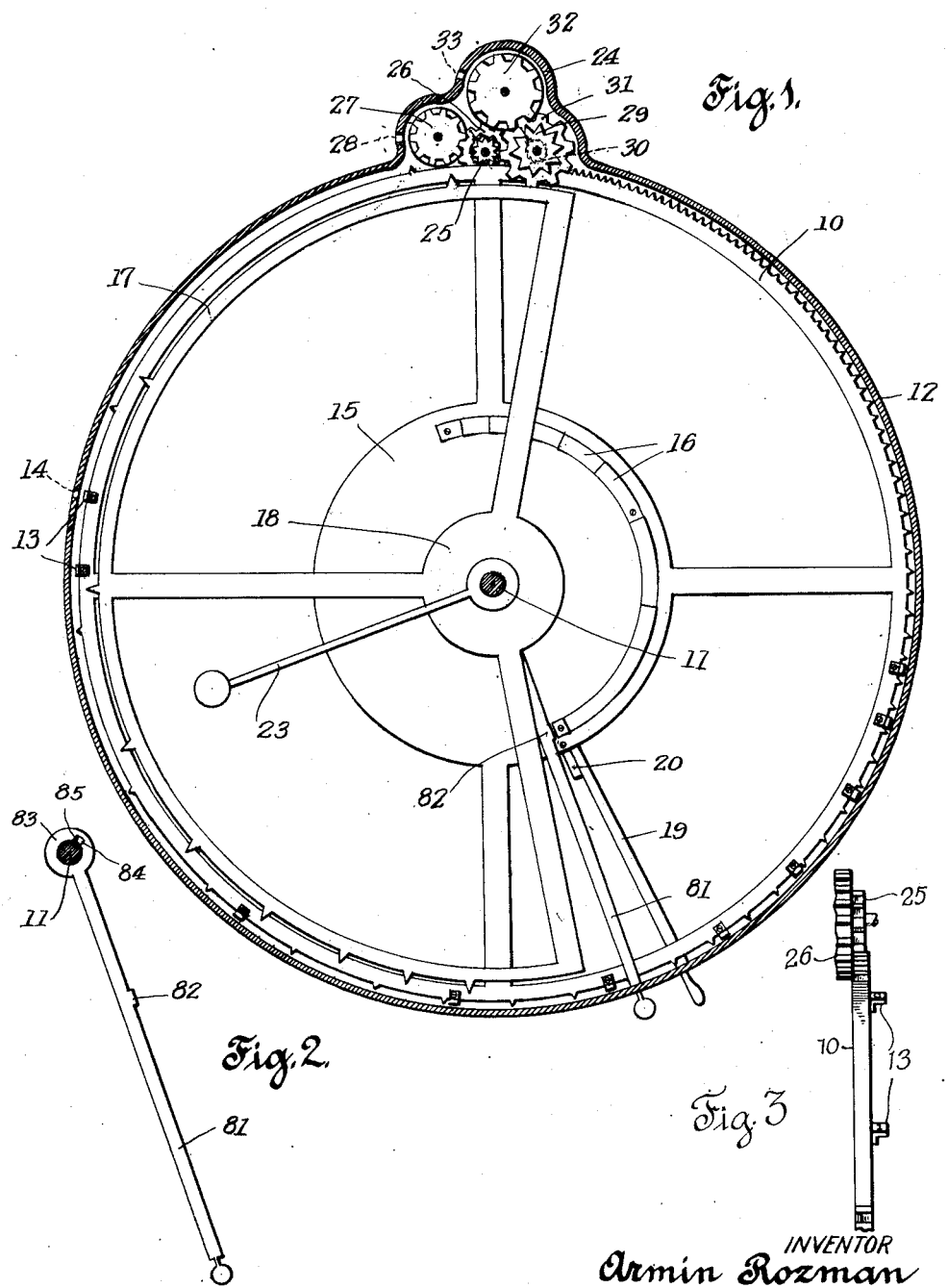
INVENTOR
Armin Rozman
BY Percy Freeman
ATTORNEY Patented Jan. 7, 1930

1,742,824

UNITED STATES PATENT OFFICE

ARMIN ROZMAN, OF POUGHKEEPSIE, NEW YORK

CALCULATING MACHINE

Application filed December 16, 1922. Serial No. 607,332.

This invention relates to calculating machines as used in solving mathematical problems, with special reference to multiplication and division, having as its main object to provide an apparatus employing logarithmic principles whereby the operation of multiplying or dividing is greatly simplified and shortened, and the problem solved almost instantly in an accurate and easy manner.

Heretofore in standard makes of so called calculating machines, in order to multiple or divide it was necessary to set up the multiplicand or dividend respectively and to make anywhere from one to nine repeat operations (depending upon the multiplier or divisor) for each unit: hence a further object is to avoid such repeat operations and instead to produce a mechanical device (or machine) which, after the multiplicand or dividend is set up, will accumulate and register the product or quotient automatically and simultaneously with the setting up of the multiplier or divisor.

Another object is the provision of a calculating machine in which the actuating elements are arranged in logarithmic relation and the actuated elements are arranged in the standard arithmatic or decimal relation.

Heretofore, calculations based on logarithms were made by use of the slide rule or like instrument but all these required a knowledge of logarithms for their intelligent use. Also, the calculations on a slide rule or the like are limited to 3 or 4 figures because separate divisions on the scale are necessary for each digit, also, with the slide rule addition or substraction could not be performed, hence a still further aim is the production of a calculating machine which performs logarithmic calculations automatically, giving the result automatically in common numbers without requiring of the person operating it a knowledge of logarithms, and also the production of a machine which though based on logarithms can be used to perform addition and substraction as well as multiplication and division.

A further aim is in the provision of an apparatus consisting of a few and simple parts, capable of economical construction, easily assembled and rapidly operated.

These objects are accomplished by the novel design, construction and arrangement of parts and use of principles hereafter described and shown in the accompanying drawing, forming part of this disclosure, and in which:—

Figure 1 is a side elevational view, partially in section, of the mechanism constituting one unit of the apparatus.

Figure 2 is a detail view of one of the elements thereof.

Stated in general terms the principle employed is the well known formula:—log $x$ plus log $y$ equals log $xy$ or in other words, numbers are multiplied by adding their logarithms and this is accomplished automatically by the mechanism without the necessity of knowledge of logarithms on part of the operator.

The apparatus comprises a wheel having teeth on its periphery arranged in logarithmic relation and numerals or digits on its rim in relation to the teeth.

The toothed wheel is rotated to transmit motion to pinions which actuate indicating wheels upon which the result of the calculation appears.

In the drawing, the numeral 10 is used to designate generically the logarithmetically divided wheel, having teeth, each tooth representing one number and its location on the rim representing the logarithm of that number, the wheel being rotatably mounted on a shaft 11 held in the side elements of an enclosing casing 12.

Secured to the rim of the wheel are ten plates 13 arranged in logarithmic relation corresponding in position to the logarithmic spacing of the teeth on said wheel and carrying numerals 0 to 9, the same being visible through an opening 14 in the casing wall.

The rim of the wheel is supported by spokes radiating from a disc hub 15 and fixed concentrically on the disc is a curved ratchet 16 having nine teeth corresponding in spacing with the first nine teeth of the wheel, operable in one direction only.

This ratchet is for the purpose of operatively connecting the wheel 10 with a segmental rim 17 which is supported by spokes radiating from the hub 18 fixed on the shaft 11, and its rim is provided with nine teeth corresponding in spacing with the first nine teeth of the wheel 10.

A lever handle 19, pivoted on shaft 11, extends through the wall of the casing into position for operation and is engageable with a lug 20 fixed to the wheel 10 when the handle is moved in one direction, this handle 19 being used to register one of the numbers, as the multiplicand, in multiplying.

Another lever handle 23 is fixed rigidly to the shaft 11 to actuate the same and a spring (not shown) inside the hub 15 is provided in any well known manner for returning the wheel 10 to its original position after operation, thus the handle 23 turns the shaft and the shaft turns the segment 17 and also moves a lever 81 which engages operatively with the wheel 10.

The lever 81 is flexible in a direction parallel to the axis of the shaft 11, but rigid in a direction at right angles to the shaft 11, and on said lever 81 is formed a lug 82 for engagement with ratchet 16 and an enlarged hub 83 having an opening fitted to the shaft 11. Leading outward from this opening is a recess 84 receptive of a key-like pin 85 extending from the shaft 11 in which it is rigidly fixed.

The segmental recess 84 is so proportioned as to allow the segment 17 to turn from a point representing "0" to "1" before the wheel 10 begins to turn.

The upper part of the casing 12 is shaped to provide a housing 24 for the gear train and display mechanism, the same including a pinion 25 having ten teeth engageable with the teeth on the wheel 10, each tooth on wheel 10 moving pinion 25 one tenth of a rotation this pinion having fixed alongside a spur pinion 26 meshing with a similar pinion 27 carrying a wheel having on its periphery numerals 0 to 9 which show through the opening 28 in the housing 24.

Another pinion 29, having ten teeth, is engageable with the teeth on the segment 17 each tooth on segment 17 moving pinion 29 one tenth of a rotation. The pinion 29 is operatively engaged, by means of a ratchet 30, with the side of a spur gear 31, which meshes with another gear 32 carrying an indicating wheel having peripheral numbers 0 to 9 which show through the opening 33 in the housing.

It is to be understood that the usual mechanical devices are incorporated in the display device, including carrying means, so that numbers of any extent may be displayed through the openings.

In order to illustrate the working of the apparatus the two principal calculations are described below.

In performing simple addition the wheel 10 is turned by means of the handle 19 until the required number is displayed through the opening 14 and registered on the wheel 27. The wheel 10 which is held stationary by means of the ratchet 16 engaging the handle 81 is then automatically returned by means of a spring (not shown) to its initial position by moving handle 81 in a lateral direction to disengage it from ratchet 16, and the second number similarly registered, the sum showing on the wheel in front of the opening 28, it being understood that ratchets are interposed between the pinion 27 and its numeral wheel to actuate the wheels in a forward direction and prevent a reverse movement.

In order to multiply use is made of the logarithmic location of the teeth on both wheel 10 and segment 17. For instance let it be required to multiply four by five, in which case the wheel 10 is turned by means of the handle 19 until the numeral "4" appears at the opening 14 at which time the wheel will have been turned a circumferential distance representing the logarithm of the number four.

The number "4" will also appear at the opening 28, four teeth on wheel 10 having engaged the double wheel 25—26 which turns wheel 27.

The wheel 10 is then held stationary by means of the ratchet 16 engaging the handle 81 and the segment 17 is turned by means of the handle 23 until the number "5" registers at the opening 33 on the wheel 32 by means of the double wheel 29—30.

In turning the handle 23, which is fixed to the shaft 11, the segment 17 turns until its periphery has turned a distance equal to the space between "0" and "1" or until the tooth "1" engages the wheel 29 before handle 81 and consequently wheel 10 is moved.

Wheel 10 then turns with the segment by means of handle 81 which is turned by the shaft 11 until the periphery of the segment 17 has turned a distance equal to the space between the teeth 1 and 5 on segment 17 which corresponds to the logarithm of "5" on both wheel 10 and 17 so that the wheel 10 has been turned distances corresponding to log "4" plus log "5" or a total of log 4×5 and 20 teeth have engaged the double wheel 25—26.

Because the logarithmic movement of wheel 10 is converted into a decimal movement of wheel 25, and the action of the machine beyond that point is similar to the movement of ordinary adding machines, it is possible to extend calculation to numbers of several digits by using a series of wheels 10, 25 and 26; the product being registered one digit at a time, with only one movement of handle 23 for each digit.

Although I have described my improvements with considerable detail and with respect to certain particular forms of my invention, I do not desire to be limited to such details since many changes and modifications may well be made without departing from the spirit and scope of my invention in its broadest aspect. This form is to be taken as merely typical of numerous constructions in which the principle of my invention may be embodied and I reserve the right to make changes in shape, size and arrangements of parts to the full extent indicated by the general or broad meanings of the terms in which the claims are expressed.

As one instance of a modification, I may make the machine or device without the segment 17, providing it is not desired to register the multiplier or divisor, in which event I would merely have numerals indicated on the casing and have the lever 23 extended beyond or through the casing and the numerals on the casing would be spaced logarithmically from 1 to 9 to indicate the amount of movement of lever 23. In this modification it is obvious that in multiplying as for instance 5 by 4, the large wheel 10 is turned until its first five teeth have meshed with the gear 26 which of course will indicate that the numeral 5 has been set up in the machine, the lug 82 having engaged the fifth tooth of the ratchet 16 to hold the wheel 10 from returning to initial position. If we now move the lever 23 a distance corresponding to the distance from tooth 1 to tooth 4 on wheel 10, we thus continue the rotation of the wheel 10 a distance corresponding to the first four teeth on its periphery, thus causing twenty teeth to mesh with gear 26 and indicate the product of 4×5 as 20. Of course what we have actually done is to obtain the product of two numbers by adding the logarithms of those numbers and indicating the result as the antilogarithm of that sum. In performing addition however, the lug 82 on the lever 81 is disengaged from the ratchet 16 and permits the wheel 10 to return to its initial position as each numeral is set up.

Or I may substitute for segment 17 a wheel without any teeth on its periphery and have on this wheel indicating numerals like the numerals shown on wheel 10 which might be seen through an opening or window in the casing to indicate the movement of the handle 23.

As another instance of a modification, the wheel 10, may be made with unequally spaced teeth which need not be logarithmically arranged on the periphery, provided the wheel is first laid out logarithmically so as to determine the logarithmic angular displacement for each number or value desired, and then to provide one tooth for each of the angular displacements anywhere on the arc of that particular angle, the main purpose being to cause the gear or pinion 25 to rotate one tooth for each logarithmic angular displacement of the large wheel 10 representing a number. However, beyond the location of the value 9, the teeth between the succeeding prime factors may be placed anywhere on the arcs between the prime factors without regard to location, it only being necessary to provide one tooth for each value, it being understood of course that the prime factor teeth must be located on the arc of its particular logarithmic angle.

Having thus described my invention, what I claim as new and desire to secure by Letters Patent, is:—

1. In a calculating machine, a wheel having peripheral teeth representing numbers spaced unequally in logarithmic relation.

2. In a calculating machine, a wheel having teeth spaced in logarithmic relation, a member having teeth, corresponding to at least the first nine teeth on said wheel, selective means for independently actuating said wheel and means for actuating said member and wheel as a unit.

3. In a calculating machine, a wheel having teeth spaced in accordance with a logarithmic scale, a counter-train having equally spaced teeth actuated by said wheel, a member having teeth corresponding the first nine teeth of said wheel, another counter-train with equally spaced teeth actuated by said member and means for actuating said first counter-train by actuation of said member.

4. In a calculating machine, a wheel having teeth spaced in accordance with a logarithmic scale, said wheel when actuated representing one of two numbers to be multiplied, a member corresponding in part with said wheel representing the other of the two numbers, means for operating said wheel and member, and means driven by said wheel for showing the result of such actuation in producing the product of said two numbers.

5. In a calculating machine the combination with two elements having teeth spaced in similar logarithmic relation, of means for independently actuating one of the elements, and means for conjunctively actuating both of the elements.

6. In a calculating machine the combination with two elements having teeth spaced in similar logarithmic relation, of means for independently actuating one of the elements, means for conjunctively actuating both of the elements, and means for indicating independently the amount of actuation of each element.

7. In a calculating machine a wheel having teeth spaced around its periphery in logarithmic relation, a ratchet integral with said wheel having teeth spaced in logarithmic relation and corresponding to the first nine teeth of the wheel, a member having teeth spaced in logarithmic relation and corresponding to the first nine teeth of the wheel, means for actuating said wheel independently of said member, and means for interlocking the member with the wheel by engaging the member with one of the ratchet teeth of the wheel for actuating the wheel by movement of the member.

8. The combination in a calculating machine, of a wheel rotatable to predetermined logarithmic angular displacements, means to rotate the wheel, means to hold the wheel at any of the said predetermined points, a gear, and means to rotate the gear one tooth during each of the logarithmic angular displacements of wheel.

9. The combination in a calculating machine, of a wheel rotatable on a shaft to predetermined logarithmic angular displacements, means to rotate the wheel independently of the shaft, means to hold the wheel at any of the said predetermined points, means for rotating the holding means to carry the wheel through a further logarithmic angular displacement, a gear, and means to rotate the gear one tooth during each of the angular displacements of the wheel.

10. A calculating machine, comprising in combination, a revoluble shaft, and a wheel having peripheral teeth located with a logarithmic angular displacement rotatable on said shaft.

11. A calculating machine comprising in combination, a revoluble shaft, a circular wheel having teeth located with a logarithmic angular displacement rotatable on said shaft, and means for operatively engaging the wheel and said shaft to rotate as a unit.

12. A calculating machine, comprising in combination, a revoluble shaft, a circular wheel having teeth located with a logarithmic angular displacement rotatable on said shaft, means to rotate the wheel independently of said shaft, and means for operatively engaging the wheel with said shaft.

13. In a calculating machine, the combination with a revoluble shaft, of a wheel having peripheral teeth located with logarithmic angular displacements rotatable on said shaft, a ratchet on said wheel, and a pawl carried by said shaft for cooperative engagement with the ratchet.

14. In a calculating machine, the combination with a revoluble shaft, of a wheel having peripheral teeth located with logarithmic angular displacements rotatable on said shaft, a ratchet on said wheel, a pawl carried by said shaft for cooperative engagement with the ratchet, independent means for rotating the wheel about the shaft.

15. In a calculating machine, the combination with a revoluble shaft, of a wheel having peripheral teeth located with logarithmic angular displacements rotatable on said shaft, a ratchet on said wheel, and a pawl carried by said shaft for cooperative engagement with said ratchet, independent means for rotating the wheel about the shaft, and independent means for rotating the shaft.

16. In a calculating machine, the combination with a revoluble shaft, of a wheel having peripheral teeth located with logarithmic angular displacements rotatable on said shaft, a ratchet on said wheel, a pawl carried by said shaft for cooperative engagement with the ratchet, independent means for rotating the wheel about the shaft, independent means for partially rotating the shaft, the latter means also serving to rotate the shaft and wheel as a unit.

17. In a calculating machine a wheel having teeth representing numbers spaced unequally in logarithmic relation, in operative engagement with a gear having uniformly spaced teeth.

18. In a calculating machine, the combination with two elements, one of which has teeth spaced in accordance with a logarithmic scale, of means for conjunctively actuating both of the elements, and means for indicating independently the amount of actuation of each element.

19. In a calculating machine, the combination with two elements, one of which has teeth spaced in accordance with a logarithmic scale, of means for conjunctively actuating both of the elements, means for indicating independently the amount of actuation of each element, and means for accumulating and indicating the results of successive actuations of the toothed element.

20. In a calculating machine, a wheel having teeth spaced around its periphery in logarithmic relation, a ratchet integral with said wheel and having teeth spaced in logarithmic relation corresponding to the first nine teeth of the wheel, a rotatable member, means for actuating said wheel independently of said member and means for interlocking the member with the wheel by engaging the member with one of the ratchet teeth for actuating the wheel by movement of the member.

21. The combination in a calculating machine of a toothed wheel rotatable to predetermined logarithmic angular displacements, a ratchet having teeth spaced in logarithmic angular relation integral with said wheel, a gear in operative engagement with the toother wheel, means to rotate the gear one tooth during each of the logarithmic angular displacements of the wheel, means for selectively engaging any one of the ratchet teeth, independent means for rotating the wheel, said engaging means serving to continue the rotation of the said wheel by movement of said engaging means.

22. A calculating machine comprising a wheel having logarithmically spaced teeth, means for rotating said wheel to a predetermined position, means to retail the wheel in such position, means to continue the rotation of said wheel to a further advanced position by rotation of the retaining means, and means to return the wheel to the first predetermined position.

23. A calculating machine comprising a wheel having logarithmically spaced teeth, means for rotating said wheel to a predetermined position, means to retain said wheel in such position, means to continue the rotation of said wheel to a further advanced position by rotation of the retaining means, means to permit the wheel to return to the first predetermined position, and means for releasing the retaining means to permit the wheel to return to initial position.

24. A calculating machine comprising in combination a revoluble shaft, a wheel having teeth located with a logarithmic angular displacement rotatable on said shaft, means to rotate the wheel independently of said shaft, means for operatively engaging the wheel with said shaft, means to rotate the shaft and wheel as a unit, means to indicate the angular movement of the shaft, means to indicate the angular movement of the wheel when rotated independently of the shaft, and means to indicate the increment of the angular movement of the wheel.

Signed at New York in the county of New York and State of New York this 8th day of December, A. D. 1922.

ARMIN ROZMAN.